United States Patent
Parpajola

(10) Patent No.: US 7,185,503 B2
(45) Date of Patent: Mar. 6, 2007

(54) CONDITIONING SYSTEM FOR A MANUFACTURING MACHINE, IN PARTICULAR A MACHINE TOOL

(75) Inventor: Vladi Parpajola, Cadoneghe (IT)

(73) Assignee: Parpas, S.p.A., Cadoneghe (IT)

( * ) Notice: Subject to any disclaimer, the term of this patent is extended or adjusted under 35 U.S.C. 154(b) by 344 days.

(21) Appl. No.: 10/676,500

(22) Filed: Oct. 1, 2003

(65) Prior Publication Data

US 2005/0076658 A1    Apr. 14, 2005

(30) Foreign Application Priority Data

Oct. 2, 2002    (IT)    ................ MI02A2077

(51) Int. Cl.
*F25D 17/00*    (2006.01)
*B23D 1/30*    (2006.01)
*F16H 57/04*    (2006.01)

(52) U.S. Cl. ............... 62/179; 62/177; 62/127; 409/135; 474/93

(58) Field of Classification Search .......... 62/179, 62/177, 178, 127; 474/93; 409/135; 52/749.1, 52/741, 745.19

See application file for complete search history.

(56) References Cited

U.S. PATENT DOCUMENTS

| | | | | | |
|---|---|---|---|---|---|
| 2,221,127 | A | * | 11/1940 | Bates | ............... 409/11 |
| 5,146,977 | A | * | 9/1992 | Kiser | ............... 165/229 |
| 5,495,721 | A | * | 3/1996 | Stueble | ............... 62/121 |
| 6,675,549 | B1 | * | 1/2004 | Kaneda et al. | ........... 52/749.1 |

* cited by examiner

*Primary Examiner*—Chen-Wen Jiang
(74) *Attorney, Agent, or Firm*—Kirschstein, et al.

(57) ABSTRACT

In a conditioning system for a manufacturing machine, in particular a machine tool, a machine tool framework is arranged inside a sealed casing. Ducts are arranged at machine tool regions to be thermally conditioned. The ducts comprise air flow outlets and are coupled to a conditioned air delivery manifold supplied by a conditioning device. Solenoid valves are provided at the outlets to control air flow.

7 Claims, 2 Drawing Sheets

CONDITIONING SYSTEM FOR A MANUFACTURING MACHINE, IN PARTICULAR A MACHINE TOOL

BACKGROUND OF THE INVENTION

1. Field of the Invention

The present invention generally relates to a thermal conditioning system for a manufacturing machine, in particular, a machine tool.

2. Description of the Related Art

As is known, prior manufacturing machines, particularly machine tools, comprise a plurality of driving motors so designed as to allow movable parts of the machine to be accurately driven.

However, both temperature variations occurring at the site of the machine tool, and heat from the machine tool driving motors, as well as friction heat generated as movable parts of the machine tool are driven, cause an undesired uneven heating of the machine tool main body, and of the movable parts thereof.

To overcome, at least partially, the effects due to the abovementioned uneven heating of the machine tool, which would decrease the required machining accuracy, it has been already suggested to provide, in prior art machine tools, channels or spaces allowing a cooling fluid to pass therethrough.

It should be readily apparent that the known cooling system, provided inside the machine tool, does not uniformly thermally condition the entire machine tool, but only some parts thereof will be generally cooled or conditioned.

SUMMARY OF THE INVENTION

Objects of the Invention

Accordingly, the main object of the present invention is to overcome the abovementioned prior art drawbacks, and provide a thermal conditioning system, which subjects the machine tool and parts thereof to a target thermal conditioning specifically adapted to contingent conditioning and cooling requirements.

Features of the Invention

According to one aspect of the present invention, the above object is achieved by a thermal conditioning system for a manufacturing machine, in particular a machine tool, characterized in that the system comprises a sealed casing for housing therein the machine tool framework. At a selected region of the machine tool to be thermally conditioned, a plurality of ducts having air flow outlets is provided. The ducts are connected to a conditioned air delivery manifold, supplied by conditioning devices arranged outside the casing. The conditioning device is coupled to and controlled by control devices on the casing.

Thus, the conditioning system according to the present invention provides the advantage that the machine tool is fully insulated from its installation site and, owing to the novel conditioning system, it is possible to hold both the machine tool framework and particular constructional elements thereof at a constant temperature.

Owing to the insulation of the machine tool with respect to the machine tool installation site, by using insulated panels, it is possible to operate the machine tool within a fully thermally conditioned environment. Moreover, by arranging the air or conditioning gas supplying ducts at different regions of the machine tool, and including adjusting means for adjusting the conditioning air flow at different regions of the machine tool and at different constructional elements thereof, it is possible to greatly increase the evenness and repeatability of the machine tool chip removal machining operations, since the machine tool construction is not deformed in an uneven manner.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
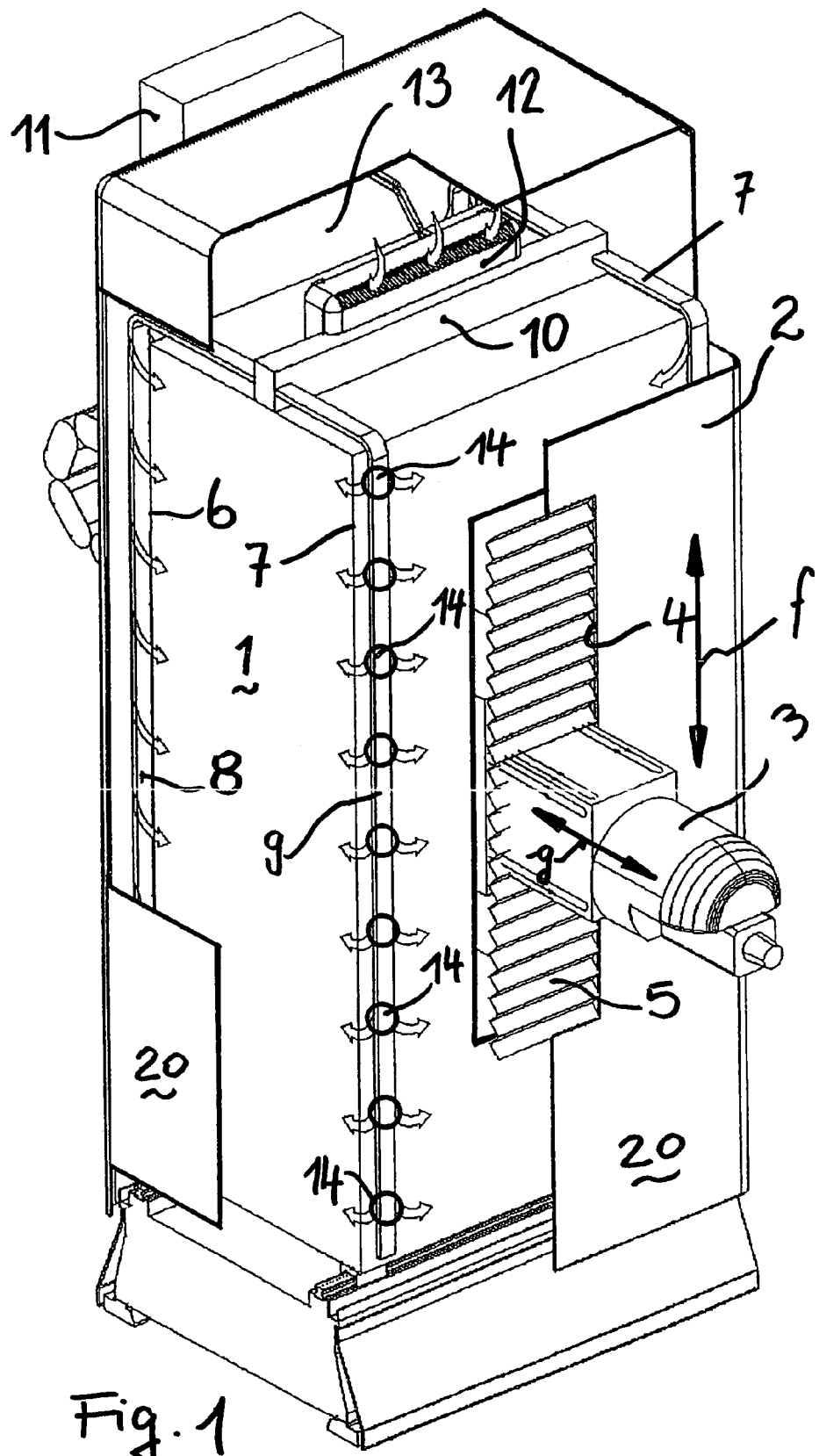
FIG. 1 is a perspective view illustrating a machine tool arranged in a casing in which conditioning means are also arranged.
Figure 2:
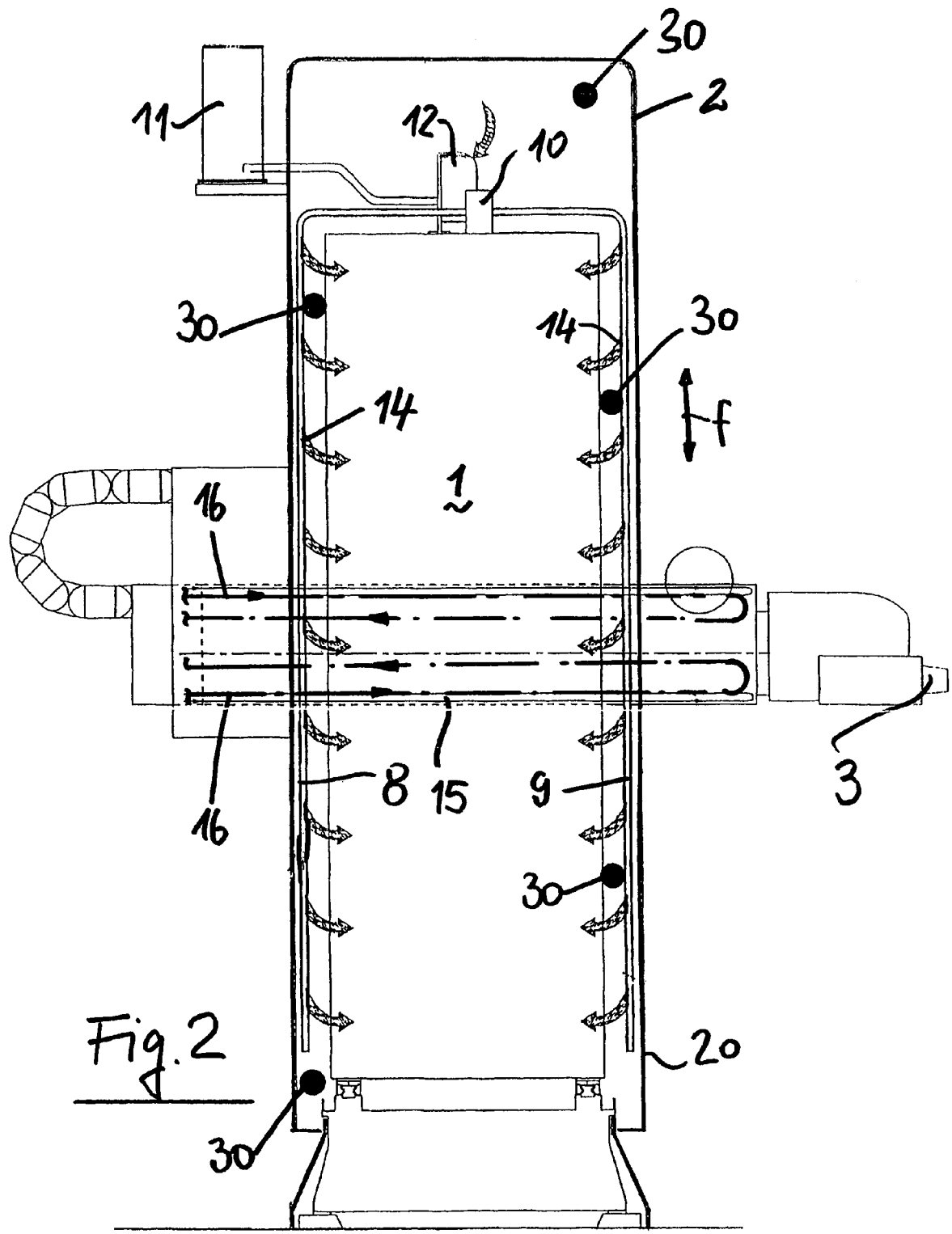
FIG. 2 is a cross-sectional view illustrating the machine tool and casing therefor.

As shown in FIG. 1, the machine tool, generally indicated herein by the reference number 1, for example a milling machine, is arranged inside a casing 2, made of a thermally insulating material and fixed to a machine tool framework.

The overall construction or framework of the machine tool 1, in particular, is housed in the casing. A spindle bearing head 3 extends out from the casing.

Since the spindle bearing head 3 of a boring or milling machine can be driven in the direction indicated by the double-headed arrows f, g, the casing 2 comprises an opening 4, including a sealing bellows 5.

Moreover, near the corners 6, 7 or other not shown corner parts, and other regions of the machine tool framework 1, a plurality of ducts 8 and 9 extending along the overall height of the machine tool are provided. The ducts 8 and 9, and other pipes, lead to one or more manifolds 10, which have been indicated only schematically. The manifold 10 is operatively connected to a conditioning apparatus 11 outside the casing.

The ducts 8 and 9, and yet other ducts, provided for delivering the conditioning air or other fluid, as schematically shown in FIG. 1 for the duct 9, are provided, at a given spacing, with a plurality of conditioning air outlet openings 14 or ports.

The overall system is advantageously provided with thermal sensors 30, arranged on several portions of the construction and operating for locally sensing temperature, thereby allowing the machine tool regions to be thermally conditioned one independent from the other.

Electronic control means are moreover provided for managing the conditioned air flows. The control means is preferably a digital control unit for generating digital control signals.

Advantageously, the openings 14 comprise adjustable valves which can be adjusted so as to control the cooling air amount to be supplied. Thus, at a region which must be subjected to a greater cooling, the valves of these openings 14 will be opened to a maximum degree, whereas at regions requiring a less cooling conditioning effect, the valves associated with those openings 14 can be only partially closed. The valves are preferably solenoid valves controlled by the digital control signals.

Advantageously, the casing 2 encompassing the machine tool framework or construction 1, comprises a plurality of panels 20 providing a high thermal insulation, and, advantageously, being so made as to be removable to allow the machine tool 1 operator to freely access the machine tool construction.

As shown, the panels 20 are directly assembled on the machine tool construction.

Further advantageously, other constructional assemblies, such as the machine tool ram 15, which can be driven with respect to the machine tool framework 1, will be thermally controlled, by supplying channels formed in the ram 15 with a controlled temperature conditioning fluid, as schematically shown by the reference number 16.

Owing to the provision of the abovementioned channels 16, for example, arranged at four corners of the ram 15, it will be possible to properly thermally control this structure.

By different temperatures of the fluid flowing through the channels, it will be possible to modify the geometrical attitude of the ram. For example, deflection camber of the ram 15 due to the horizontal ram weight and other portions such as the spindle bearing head can be corrected by supplying a cooler fluid to the top channels and a hotter fluid to the bottom channels, thereby providing a thermal distortion compensating for the deflection camber.

It will be understood that each of the elements described above, or two or more together, also may find a useful application in other types of constructions differing from the types described above.

While the invention has been illustrated and described as embodied in a conditioning system for a manufacturing machine, in particular a machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A thermal conditioning system for a manufacturing machine having a movable element, comprising: a casing for receiving therein a framework of the machine, the casing being sealed with respect to the outside environment, the casing having an opening through which the movable element projects; a sealing bellows element at the opening and engaging the movable element extending through the opening in a sealed manner; a plurality of ducts having air flow outlet openings at selected regions of the machine to be thermally conditioned; a conditioning device for supplying conditioned air; and a manifold coupled to the ducts, and operative for delivering the conditioned air supplied by the conditioning device to the ducts for discharge through the outlet openings.

2. The conditioning system of claim 1, in that the casing is made of a thermally insulating material.

3. The conditioning system of claim 1, in that the outlet openings comprise adjustable valves to adjust an amount of the conditioned air exiting the outlet openings.

4. The conditioning system of claim 1, in that removable panels form the casing.

5. The conditioning system of claim 1, in that the movable element projecting from the casing comprises inner top and bottom channels through which a conditioning fluid is caused to pass.

6. The conditioning system of claim 1, in that the casing comprises therein thermal sensors for detecting local temperatures inside the casing, in that the sensors are coupled to a digital control unit for the machine, and in that the outlet openings through the ducts comprise solenoid valves which are controlled to respectively open and close by signals from the digital control unit of the machine.

7. The conditioning system of claim 1, in that the machine is a machine tool, and in that the movable element is a ram.

\* \* \* \* \*